United States Patent [19]

Onishi et al.

[11] Patent Number: 4,864,774
[45] Date of Patent: Sep. 12, 1989

[54] DOOR GLASS RUN FOR AUTOMOBILE

[75] Inventors: Kunikazu Onishi, Kasugai; Hisayuki Kisanuki, Aichi; Takeshi Naito, Inazawa, all of Japan

[73] Assignee: Toyoda Gosei Co., Ltd., Nishikasugai, Japan

[21] Appl. No.: 170,355

[22] Filed: Mar. 18, 1988

[30] Foreign Application Priority Data

Mar. 30, 1987 [JP] Japan .................................. 62-77161
Sep. 26, 1987 [JP] Japan ................................. 62-241759

[51] Int. Cl.$^4$ .............................................. E06B 7/16
[52] U.S. Cl. ........................................ 49/440; 49/492
[58] Field of Search ............... 49/440, 441, 492, 374, 49/436, 490, 493

[56] References Cited

U.S. PATENT DOCUMENTS 4,266,824  5/1981  Inamoto ................................. 49/490
4,409,756  10/1983  Audewino .............................. 49/493
4,649,668  3/1987  Skillen et al. .

FOREIGN PATENT DOCUMENTS 0040588  11/1981  European Pat. Off. .............. 49/374
2127097  12/1972  Fed. Rep. of Germany ........ 49/441
3442241  5/1986  Fed. Rep. of Germany .
557130  4/1923  France ................................. 49/440

Primary Examiner—Kenneth J. Dorner
Assistant Examiner—Gerald A. Anderson
Attorney, Agent, or Firm—Cushman, Darby & Cushman

[57] ABSTRACT

A door glass run for automobile provided with a recessed groove for sliding a door glass thereon, installed on a door panel, which comprises an insert positioned on an inner periphery side of the recessed groove and consisting of a hard synthetic resin formed along a profile of the door panel, and a body consisting of elastomer position on an outer periphery side of the insert. A glass slide positioned on a bottom portion of the recessed groove and a glass retainer positioned on a side portion of a car outside of the door glass in the recessed groove are formed on the insert. Further, a locking leg projecting to pass through the body from a predetermined position on an outer periphery side of the glass slide and mountable in a fitting hole of the door panel is formed on the insert.

10 Claims, 6 Drawing Sheets

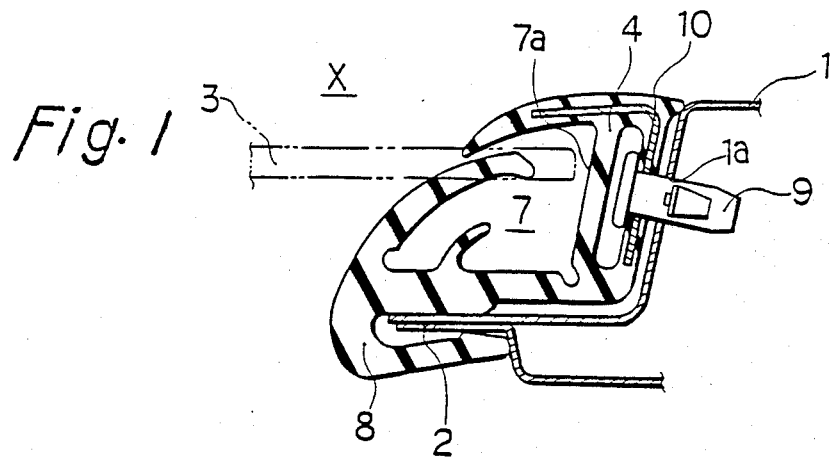
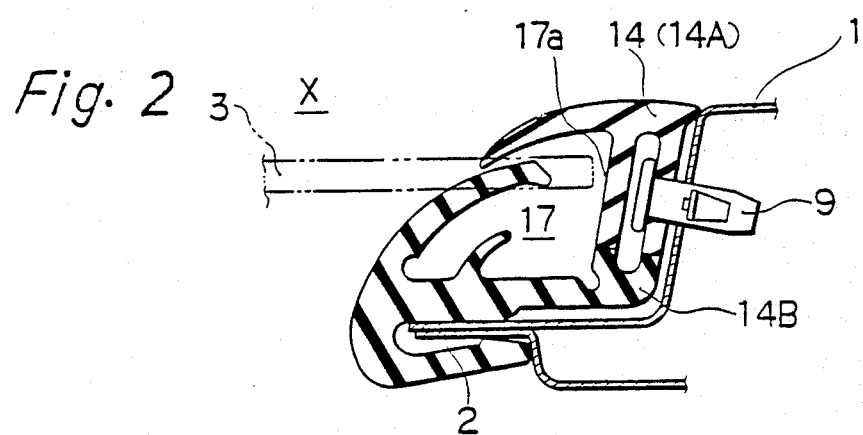
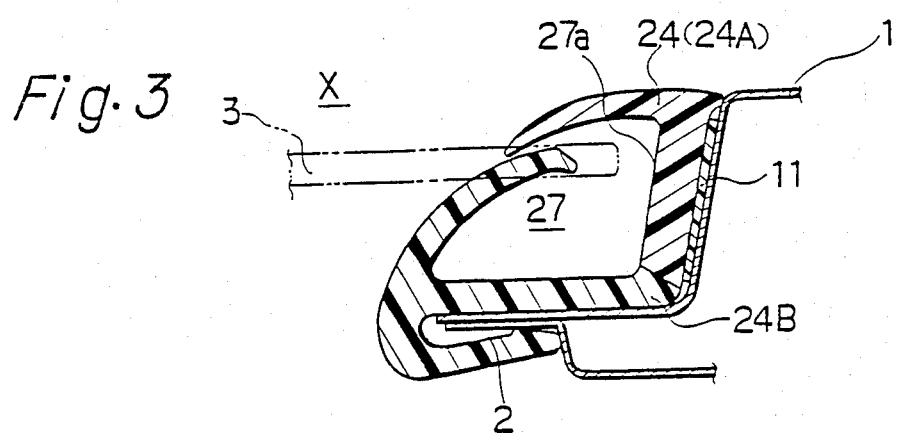

DOOR GLASS RUN FOR AUTOMOBILE

BACKGROUND OF THE INVENTION

Field of the Invention

This invention relates to a door glass run for automobile for sliding a door glass in a recessed groove, which is installed on an automobile door panel.

Description of the Prior Art

A prior art door glass run for automobile (hereinafter abbreviated as "glass run") of this kind is exemplified as shown in FIG. 1.

A glass run 4 is provided with a recessed groove 7 for sliding a door glass 3, a hold 8 for holding a flange part 2 of a door panel 1, and a clip 9 for installing the glass run 4 on the door panel 1, which is engagable in a fitting hole 1a of the door panel 1.

The glass run 4 is molded of a soft rubber through extrusion in consideration of a sealing efficiency of the door glass 3 with the door panel 1 and has a sheet-metal insert 10 buried within a car outside X in consideration of a retentivity of the door glass 3 on the car outside X.

Since the insert 10 is bent to use, it is formed like fish bones ( ) axially.

The prior art glass run 4 has the insert 10 formed like fish bones buried within the car outside X, therefore the surface of the car outside X is capable of being rugged by the insert 10, and thus a surface appearance of the product is marred consequently thereby.

Besides, a sliding resistance of a bottom portion 7a across which an end surface of the door glass 3 slides is high in the recessed groove 7 on which the door glass 3 slides, thus easily wearing the bottom portion 7a. To enhance a wear resistance of the bottom portion 7a, a surface treatment such as electrostatic raising, urethane coat or the like is required.

Now, therefore, in a closed state and hence for internal study purpose only, the applicant has developed glass runs shown in FIG. 2 and FIG. 3, which are effective in preventing a surface appearance of the car outside X from being marred without deterioration of a retentivity of the door glass, and also in enhancing a wear resistance of the recessed groove bottom portion across which the door glass slides.

A glass run 14 shown in FIG. 2 is a dichromatic extrusion molding to have a car outside portion 14A to be disposed on the car outside X formed of a hard rubber such as hard EPDM or the like and also a car inside portion 14B formed of a soft rubber such as soft EPDM or the like.

Then, a glass run 24 shown in FIG. 3 is a dichromatic extrusion molding to have a car outside portion 24A formed of a hard synthetic resin such as hard PVC or the like and also a car inside portion 24B formed of a soft synthetic resin such as soft PVC or the like. A reference numeral 11 denotes a front-back adhesive tape for installing the glass run 24 on the door panel 1.

Both the glass runs 14, 24 have the sheet-metal fishbonelike insert 10 not buried within the car outside X, therefore a surface appearance of the car outside X will not be marred, and further since the car outside portions 14A, 24A are formed of hard rubber or synthetic resin, a retentivity of the door glass 3 will not be deteriorated.

Further, the glass runs 14, 24 have the car outside portions 14A, 24A formed of hard rubber or synthetic resin, and a wear resistance of recessed groove bottom portions 17a, 27a coming in slide with the door glass 3 positioned at the car outside portions 14A, 24A is enhanced.

However, the door panel 1 on which the glass runs 14, 24 are installed has normally a predetermined curvature longitudinally of the glass runs. Further, it is necessary that the glass runs 14, 24 obtained through extrusion molding linearly be bent and installed to the bent door panel 1. However, since the car outside portions 14A, 24A are rigid and hard, it is difficult to install the glass runs 14, 24 fitly to the door panel 1, and thus the glass runs 14, 24 are not to fit well to the door panel 1.

Incidentally, it is conceivable that a hardness of the car outside portions 14A, 24A be moderated so as to install them fitly to the door panel 1. However, to moderate the hardness is to deteriorate a wear resistance of the recessed groove bottom portions 17a, 27a, thus requiring a surface treatment such as electrostatic raising, urethane coat or the like. Still further, since the car outside portions 14A, 24A are not soft perfectly but semihard, it is difficult to open recessed grooves 17, 27 for applying treatment such as electrostatic raising, urethane coat or the like on the bottom portions 17a, 27a, thus taking much time and trouble for the surface treatment.

SUMMARY OF THE INVENTION

An object of the invention is to provide a glass run which is effective in preventing a surface appearance from being marred without deteriorating retentivity of a door glass, enhancing wear resistance of a recessed groove bottom portion, and further improving fitting efficiency to a door panel.

The aforementioned object is attained by constituting a door glass run for automobile of a recessed groove for sliding a door glass; an insert positioned on an inner periphery side of the recessed groove and consisting of a hard synthetic resin formed along profile of a door panel; a body positioned on an outer periphery side of the insert and consisting of elastomer; a hold formed on the body and holding a flange part of the door panel; a glass slide formed on the insert and positioned at the recessed groove bottom portion; a glass retainer formed on the insert and positioned on a side of the car outside of the door glass; a locking leg formed on the insert, protruding to pass through the body from a predetermined position on an outer periphery side of the glass slide, and mountable in a fitting hole of the door panel.

In the glass run relating to the invention, the glass slide of the insert consisting of a hard synthetic resin is disposed on a bottom portion of the recessed groove across which an end surface of the door glass slides in operation according to the aforementioned construction, therefore a wear resistance of the recessed groove bottom portion is enhanced.

Further, in the glass run relating to the invention, the glass retainer of the insert consisting of a hard synthetic resin is disposed on a side of the recessed groove for retaining the car outside of the door glass, and the insert is mounted in a fitting hole of the door panel by the locking leg provided protrusively to an outer periphery side of the glass slide according to the aforementioned construction, therefore a retentivity of the door glass will never be deteriorated.

Still further, in the glass run relating to the invention, a sheet-metal fish-bonelike insert is not buried as is the case hitherto, but the insert formed along profile of the door panel to be installed is disposed on an inner periphery side of the recessed groove according to the aforementioned construction, therefore not only a surface appearance will not be marred but also a fitting efficiency to the door panel can further be enhanced as compared with the prior art glass run.

BRIEF DESCRIPTION OF THE DRAWINGS

FIG. 1 is a sectional view of a prior art glass run in a service mode.

FIG. 2 is a sectional view of an improved prior art glass run in a service mode.

FIG. 3 is a sectional view of another improved prior art glass run in a service mode.

DESCRIPTION OF THE PREFERRED EMBODIMENTS

Preferred embodiments of the invention will now be described with reference to the accompanying drawings.

Figure 4:
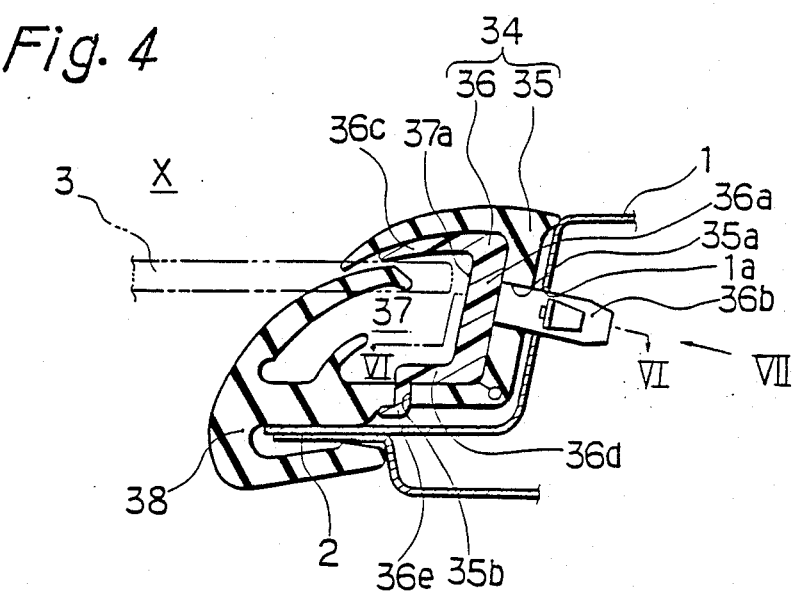
FIG. 4 is a sectional view of a glass run in a service mode which is given in a first embodiment of the invention, representing a portion taken on line IV—IV of FIG. 5.
Figure 5:
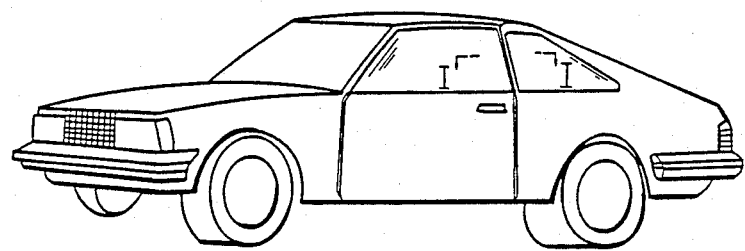
FIG. 5 is a perspective view of an automobile on which the glass run of the first embodiment is used.

A glass run 34 of a first embodiment which is shown in FIG. 4 is used on a center pillar of an automobile as shown in FIG. 5, and is provided with a recessed groove 37 for sliding the door glass 3 and a hold 38 for holding the flange 2 of the door panel 1 as in the past.

Then, the glass run 34 is constituted of two parts coming in an insert 36 positioned on an inner periphery side of the recessed groove 37 and formed of PA (6 nylon) which is a hard synthetic resin 110 or so in Rockwell (R scale) hardness through extrusion molding, and a body 35 positioned on an outer periphery side of the insert 36 and formed of soft EPDM through extrusion molding. Then, the insert 36 may be formed of a hard synthetic resin 80 or over in Rockwell (R scale) hardness.

With the section U-shaped, the insert 36 is provided with a glass slide 36a positioned on a bottom portion 37a of the recessed groove 37 for sliding the door glass 3 thereon, a glass retainer 36c positioned on a side of the car outside X of the door glass 3 in the recessed groove 37, and further with a lock 36d for locking a side of the hold 38 of the body 35. Then, as shown in FIG. 7, the insert 36 is axially formed to a predetermined shape curvedly to coordinate with the door panel 1 to be installed.

Figure 6:
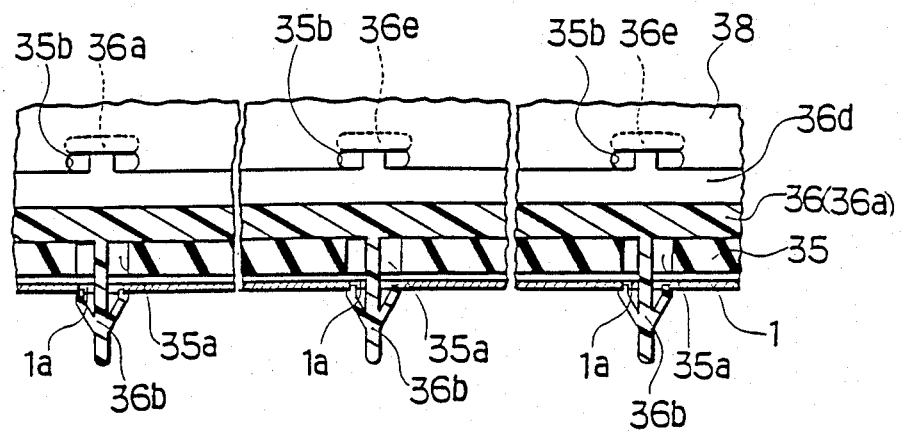
FIG. 6 is a sectional view taken on line VI—VI of FIG. 4.
Figure 7:
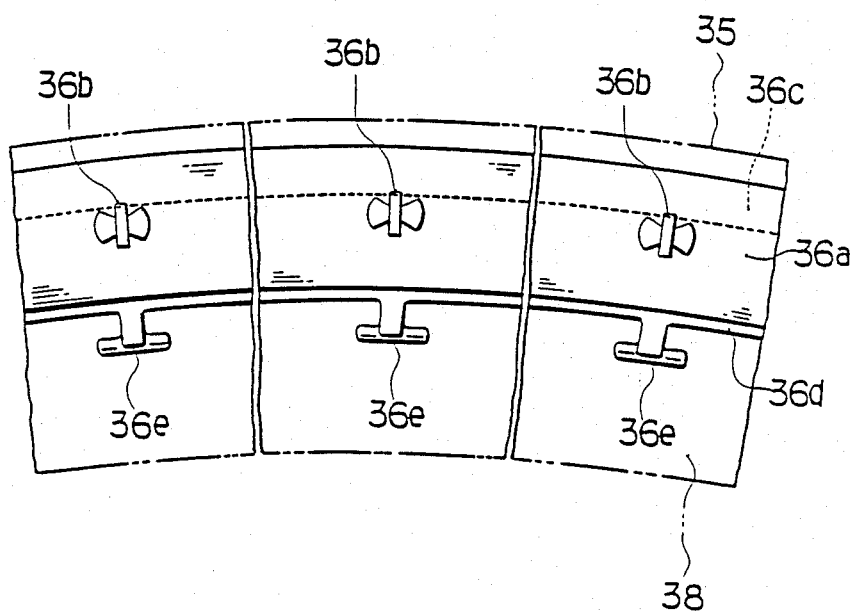
FIG. 7 is a side view of an insert of the embodiment viewed in the direction VII of FIG. 4.

A plurality of locking legs 36b mountable in each fitting hole 1a of the door panel 1 are provided projectingly through each insertion hole 35a at a predetermined position on an outer periphery side of the glass slide 36a in the insert 36 (FIGS. 4, 6, 7).

Then, a plurality of locking projections 36e for locking a side of the hold 38 through each insertion hole 35b on the side of hold 38 in the body 35 are provided at a predetermined position of the lock (engaging means) 36d in the insert 36.

Incidentally, since the body 35 is formed to have the recessed groove 37 opened in section, the locking projection 36e of the lock 36d in the insert 36 is provided so as to facilitate installation of the glass run 34 to the door panel 1 before installation to the door panel 1. That is, the locking projection 36e of the lock 36d is provided for keeping the body 35 closed in shape (along an outer periphery side of the insert 36) so as to lock a side of the hold 38 of the body 35 in cooperation with the locking leg 36b inserted in the insertion hole 35a (engaging means) of the body 35 and thus to form the recessed groove 37 beforehand. Instead of providing the lock 36d and the locking projection 36e, needless to say, it is conceivable that the body 35 be kept closed in shape to form the recessed groove 37 along the door panel 1 at the time of installation to the door panel 1.

Referring now to installation of the glass run 34 to the door panel 1, first the locking projection 36e and the locking leg 36b of the lock 36d in the insert 36 are inserted in the insertion holes 35a, 35b perforated in the body 35 at predetermined positions after extrusion molding of the body 35, and the glass run 34 is formed to a closed predetermined shape. Then, from holding the flange 2 of the door panel 1 on the hold 38 and locking the locking leg 36b in the predetermined fitting hole 1a of the door panel 1, the glass run 34 can be installed to the door panel 1.

Then, in the glass run 34 after installation, since the glass slide 36a of the insert 36 which consists of a hard synthetic resin such as PA or the like is disposed on the bottom portion 37a of the recessed groove 37 across which an end surface of the door glass 3 slides when working, a wear resistance of the recessed groove bottom portion 37a is enhanced.

Further, the insert 36 locked in the door panel 1 through the locking leg 36b has its glass retainer 36c disposed on the car outside X of the door glass 3, a retentivity of the door glass 3 can be secured throughly.

Still further, in the glass run 34, the conventional fish-bonelike insert 10 is not used, but the insert 36 formed along a profile of the door panel 1 to be installed is disposed on an inner periphery side of the recessed groove 37, therefore not only a surface appearance will not be marred but also a fitting efficiency to the door panel 1 can further be enhanced.

Figure 8:
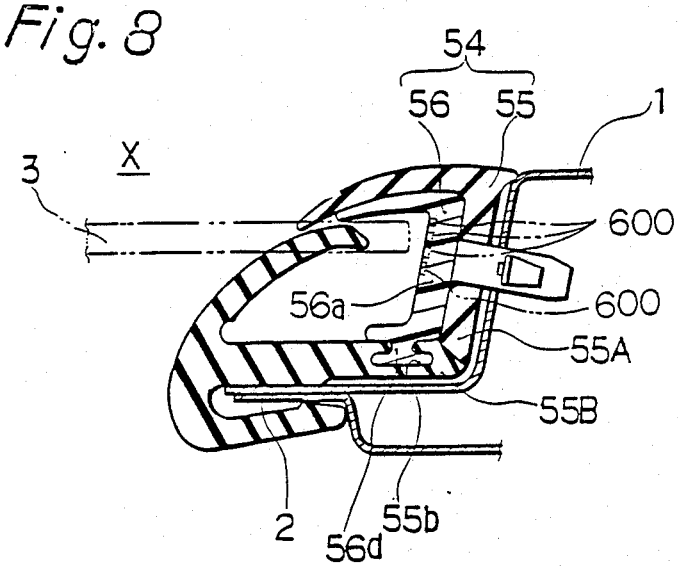
FIG. 8 is a sectional view of a second embodiment in a service mode.

Then in the first embodiment, the body 35 is exemplified by that of being formed of rubber, however, the body 35 may be formed of elastomer consisting of soft rubber, soft synthetic resin or the like, moreover, a body 45 may be formed of soft PVC otherwise like a glass run 44 of a second embodiment shown in FIG. 8.

Further, a lock (engaging means) 46d of an insert 46 equipped with a glass slide 46a and a glass retainer 46c may be constructed to be locked on a fin (engaging means) 45b formed on an inner periphery of a recessed groove 47 on the side of a body hold 48 like the glass run 44 of the second embodiment. From constructing such, the body 45 kept open in section after molding can be formed to a closed predetermined shape.

Figure 9:
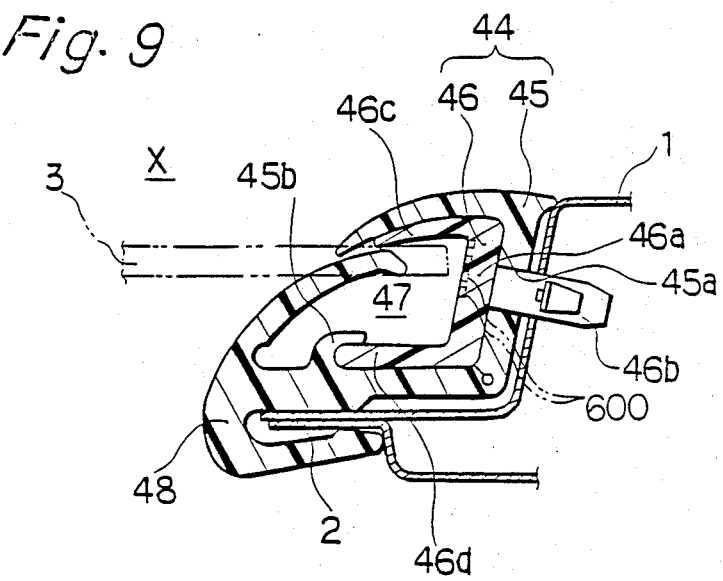
FIG. 9 is a sectional view of a third embodiment in a service mode.

Further, it may be constructed like a glass run 54 of a third embodiment shown in FIG. 9.

The glass run 54 has a body 55 consisting of elastomer such as soft rubber, synthetic resin or the like constructed of a car outside portion 55A and a car inside portion 55B. Then, an insert 56 is set beforehand to molding in the extrusion mold when the car outside portion 55A is molded. Thus, the insert 56 and the car outside portion 55A are formed integrally.

The glass run 54 has mutual fitting zones 55b, 56d of the car inside portion 55B and the insert 56 obtained through extrusion molding or injection molding separately fitted axially each, and thus is ready for forming to a predetermined shape easy to install on the door panel 1.

The glass run 54 according to the third embodiment is advantageous as compared with the glass runs 34, 44 of the first and second embodiments. That is, in the case of glass runs 34, 44 of the first and second embodiments, locking legs 36b, 46b of the inserts 36, 46 are inserted in insertion holes 35a, 45a of the bodies 35, 45, and the locking projection 36e and the lock 46d are locked in the body insertion hole 35b and the fin 45b to a predetermined shape. Then, in the glass run 54 of the third embodiment, the mutual fitting zones 55b, 56d are simply fitted longitudinally (axially) of the door glass run 55a to a predetermined shape, thus facilitating the assembling work.

Figure 10:
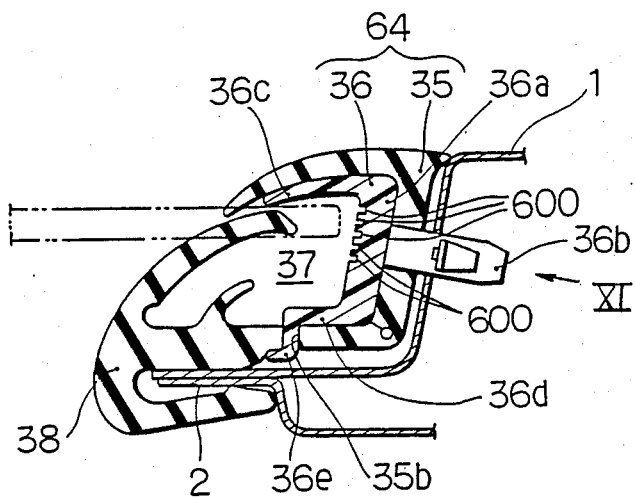
FIG. 10 is a sectional view of a fourth embodiment in a service mode.

Further, the glass run 34 of the first embodiment is exemplified by that for which a sliding surface of the glass slide 36a in the insert 36 with the door glass 3 is made almost flat, however, it may be constructed like a glass run 64 of a fourth embodiment shown in FIG. 10.

Figure 11:
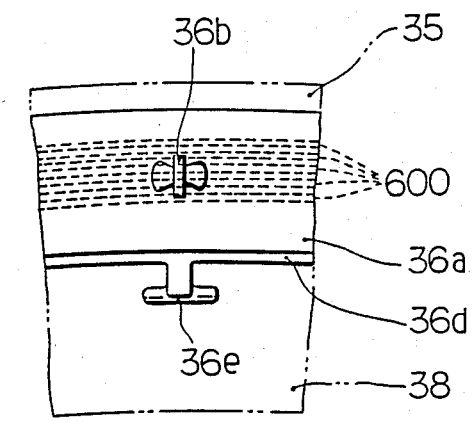
FIG. 11 is a side view of an insert of the fourth embodiment viewed in the direction XI of FIG. 10.
Figure 12:
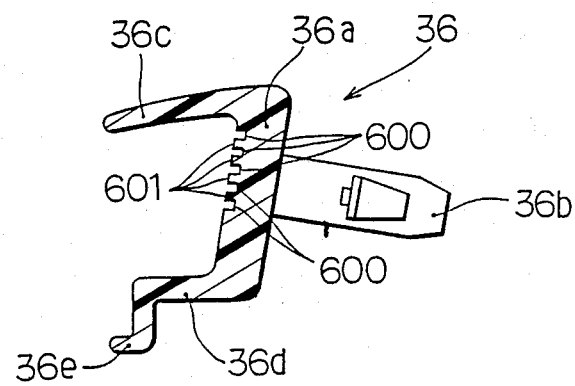
FIG. 12 is an enlarged sectional view of the insert of the embodiment.

In the glass run 64 of the fourth embodiment, a plurality (five in the embodiment) of recessed slits 600 are formed in a sliding direction of the door glass 3 on an inner periphery of the glass slide 36a in the insert 36, whereat it slides with the door glass 3 (FIGS. 11, 12). Barring the point mentioned above, it is formed likewise as the glass run 34 given in the first embodiment.

From forming such, even if muddy water, dust or the like happens to come into the recessed groove 37 and stick on an inner periphery of the glass slide 36a, a sound arising at the time of sliding of the door glass 3 can be decreased. That is, since muddy water, dust or the like is enclosed in the recessed slits 600 at the time of sliding of the door glass 3, a frictional resistance between the door glass 3 and the glass slide 36a can be decreased, and a sliding sound can thus be decreased.

Figure 13:
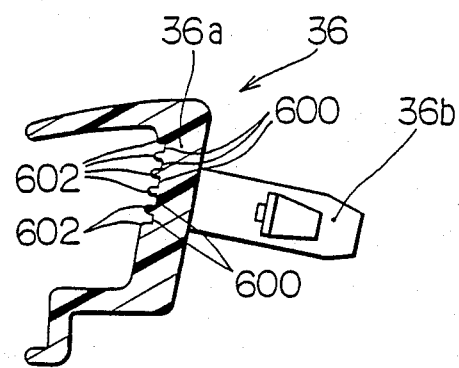
FIG. 13 is an enlarged sectional view representing a variant of the insert of the embodiment.

Then, in case the recessed slits 600 are formed, circular arc portions 602 may be provided on both sides of the recessed slit 600 as shown in FIG. 13.

Figure 14:
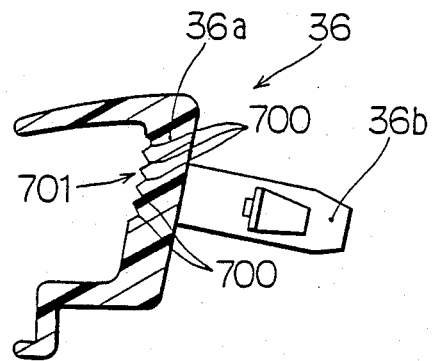
FIG. 14 is an enlarged sectional view representing another variant of the insert of the embodiment.
Figure 15:
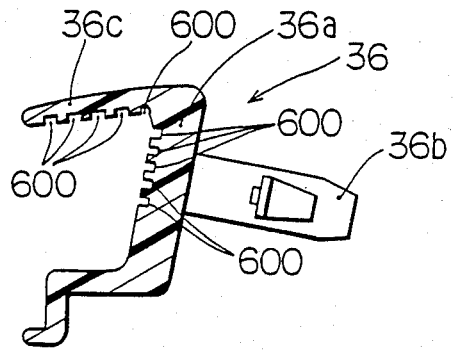
FIG. 15 is an enlarged sectional view representing a further variant of the insert of the embodiment.

Further, as shown in FIG. 14, a plurality of recessed slits 700 triangular in section each will be provided, and thus a saw-toothed tongued-and-grooved face 701 may be formed on the glass slide 36a to cope therewith.

Then, these recessed slits 600 may be provided, needless to say, on inner peripheries of the glass slides 46a, 56a in the inserts 46, 56 of the second and third embodiments shown in FIGS. 8 and 9.

Still further, the recessed slits 600 may be formed not only on the glass slide 36a in the insert 36 but also on an inner periphery of the glass retainer 36c likewise as shown in FIG. 12, and in this case, the sliding sound at the time of sliding of the door glass 3 can further be prevented.

What is claimed is:

1. A door glass run for an automobile, installed on a door panel of the automobile which has a flange and a fitting hole, said door glass run comprising:

a main body portion formed from an elastomeric material, said main body portion including a holding portion for holding the flange of the door panel, said main body portion defining a recessed groove for slidably receiving a door glass;

an insert element formed from a hard synthetic resin position on an inner peripheral side of said recessed groove and formed along a profile of the door panel, said insert element defining a glass slide portion on a bottom portion of said recessed groove and a glass retainer portion on a side portion of the automobile outside of the door glass;

said insert element further including a locking leg projecting from a predetermined position on an outer peripheral side of said glass slide portion and passing through said main body portion, said locking leg being mountable in the fitting hole of the door panel.

2. The door glass run for automobile as defined in claim 1, wherein a plurality of recessed slits in a sliding direction of the door glass are formed on an inner periphery of the glass slide of said insert.

3. The door glass run for automobile as defined in claim 2, wherein a plurality of recessed slits in a sliding direction of the door glass are formed on an inner periphery of the glass retainer of said insert.

4. A door glass run for an automobile installed on a door panel of the automobile which has a flange and a fitting hole, said door glass run comprising:

a main body portion formed from elastomeric material, said main body portion including a holding portion for holding the flange of the door panel, said main body portion defining a recessed groove for slidably receiving a door glass;

an insert element formed from a hard synthetic resin positioned on an inner peripheral side of the recessed groove and formed along a profile of the door panel, said insert element defining a glass slide portion on a bottom portion of said recessed groove and a glass retainer portion on a side portion of the automobile outside of the door glass;

a locking leg formed on said insert element so as to project from a predetermined position on an outer peripheral side of said glass slide portion through said main body portion and mountable to the fitting hole of the door panel; and engaging means formed on said insert element and said holding portion of said main body portion and locking said holding portion on said insert element to form said main body portion to a shape along the door panel.

5. The door glass run for automobile as defined in claim 4, wherein a plurality of recessed slits in a sliding direction of the door glass are formed on an inner periphery of the glass slide of said insert.

6. The door glass run for automobile as defined in claim 5, wherein a plurality of recessed slits in a sliding direction of the door glass are formed on an inner periphery of the glass retainer of said insert.

7. The door glass run for automobile as defined in claim 4, said engaging means comprising:

a lock formed at a position opposite to said glass retainer across said glass slide in said insert, and provided with a locking projection protruding to an outer periphery side of said insert;

a portion or peripheral edge of an insertion hole formed on the hold of said body, which is locked on said locking projection.

8. The door glass run for automobile as defined in claim 4, wherein said engaging means comprises;

a lock formed at a position opposite to said glass retainer across said glass slide in said insert;

a fin formed on the hold of said body, and locking a nose of said lock.

9. A door glass run for an automobile, installed on a door panel of the automobile which has a flange and a fitting hole, said door glass run comprising:

a main body portion formed from an elastomeric material, said main body portion including a car inside portion for holding the flange of the door panel and a car outside portion, said main body portion defining a recessed groove for slidably receiving a door glass;

an insert element formed from a hard synthetic resin positioned on an inner peripheral side of the recessed groove and formed along a profile of the door panel, said insert element defining a glass slide portion on a bottom portion of said recessed groove and a glass retainer portion on a side portion of the automobile outside of the door glass;

a locking leg defined on said insert so as to project from a predetermined position on an outer peripheral side of said glass slide portion through the car outside portion of said main body portion and mountable in the fitting hole of the door panel; and a fitting part formed correspondingly to a position opposite to said glass retainer portion across said glass slide portion in said insert element and the car inside portion of the main body portion and fitting and locking the car inside portion of the main body portion to the insert element longitudinally of the door glass run.

10. The door glass run for automobile as defined in claim 9, wherein a plurality of recessed slits in a sliding direction of the door glass are formed on an inner periphery of the glass slide of said insert.

* * * * *